United States Patent [19]

Gimpel et al.

[11] Patent Number: 4,623,679

[45] Date of Patent: Nov. 18, 1986

[54] PREPARATION OF A BINDER SUITABLE FOR COATING AGENTS

[75] Inventors: Juergen Gimpel, Ludwigshafen; Erich Gulbins, Heidelberg; Gregor Ley, Wattenheim, all of Fed. Rep. of Germany

[73] Assignee: BASF Aktiengesellschaft, Ludwigshafen, Fed. Rep. of Germany

[21] Appl. No.: 744,224

[22] Filed: Jun. 13, 1985

[30] Foreign Application Priority Data

Jun. 15, 1984 [DE] Fed. Rep. of Germany ....... 3422216

[51] Int. Cl.$^4$ .................. C08L 63/00; C08L 61/04
[52] U.S. Cl. .................................. 523/410; 524/508; 524/510; 524/811; 524/841; 525/142; 525/143
[58] Field of Search ............ 523/410; 524/811, 841, 524/508, 510; 525/142, 143, 153

[56] References Cited

U.S. PATENT DOCUMENTS

| | | | |
|---|---|---|---|
| 3,536,783 | 10/1970 | Jeffreys et al. | 260/845 |
| 3,538,972 | 11/1970 | Yurcick | 152/354 |
| 3,644,570 | 2/1972 | Jeffreys | 260/845 |
| 3,784,496 | 1/1974 | Smith et al. | 260/29.3 |
| 3,944,703 | 3/1976 | Harding | 428/288 |
| 4,246,144 | 1/1981 | Girgis | 260/5 |
| 4,316,827 | 2/1982 | Pacala et al. | 260/17.2 |
| 4,316,968 | 2/1982 | Girgis | 525/135 |
| 4,400,229 | 8/1983 | Demmer et al. | 156/307.5 |

*Primary Examiner*—Theodore E. Pertilla
*Attorney, Agent, or Firm*—Keil & Weinkauf

[57] ABSTRACT

A binder which is suitable for coating agents and is based on a combination which is essentially free of protective colloids and consists of an aqueous primary dispersion of a synthetic polymer and a water-insoluble polycondensate of phenols and aldehydes, some of which may be replaced by ketones, is prepared by a process in which the phenolic components for the polycondensate are first mixed with an aqueous primary dispersion of a synthetic polymer which contains glycidyl, carbonyl, N-methylol, N-alkoxymethyl, ether, amino and/or hydrazo groups and may furthermore contain carboxyl or hydroxyl groups, and the polycondensation with the aldehydes (and ketones) is then carried out in this mixture, under conventional conditions.

The binders prepared according to the invention are useful as binders for dispersion paints and coatings, in particular as heat-curable binders for metal finishes.

7 Claims, No Drawings

PREPARATION OF A BINDER SUITABLE FOR COATING AGENTS

The present invention relates to a process for the preparation of a binder which is suitable for coating agents and is based on a combination of an aqueous primary dispersion of a synthetic polymer and a water-insoluble polycondensate of phenols and aldehydes and/or ketones, and the use of these binders for dispersion paints having a long shelf life.

Coating agents based on a combination of primary dispersions and phenol/formaldehyde resins are known. For example, U.S. Pat. No. 3,538,972 describes a binder for a textile coating which is obtained by mixing a primary dispersion with a precondensate of a phenol resin. After the addition of further formaldehyde, the coating is cured in a basic medium. U.S. Pat. No. 3,784,496 describes a binder for a wood coating, which is prepared by mixing a primary dispersion with a precondensate of a phenol resin. U.S. Pat. Nos. 3,944,703, 4,246,144 and 4,316,968 describe binders for glass fiber coatings which consist of a precondensate of a phenol resin and a primary dispersion. German Laid-Open Applications DOS Nos. 1,720,301 and 1,947,964 disclose rubber-modified novolaks. The rubber latex can be added before or during the reaction of the aldehyde with the phenol. However, it is stated that it is advantageous to add the rubber latex when the phenol/aldehyde reaction is complete. This process does not give a stable dispersion but solid novolak resins. U.S. Pat. No. 4,316,827 describes a process for the preparation of cured resin particles, wherein phenols are reacted with an aldehyde in an aqueous medium in the presence of a basic catalyst, a protective colloid and a rubber latex, the mixture is acidified and the particles are then separated off from the aqueous medium. The rubber dispersions mentioned here include carboxylated butadiene/acrylonitrile, styrene/butadiene and polyacrylate latices. None of these processes for the preparation of coating agents consisting of a combination of a primary dispersion and a polycondensate based on phenol and aldehydes gives a stable total colloidal system. These processes are therefore unsuitable for the preparation of binders for dispersion paints having a long shelf life.

It is an object of the present invention to provide a process for the preparation of coating agents which are based on a mixture of a primary dispersion and a water-insoluble polycondensate of phenols and aldehydes and/or ketones, have a long shelf life and contain particles smaller than 1 $\mu$m in diameter and are therefore suitable as binders for dispersion paints.

We have found that this object is achieved in a very advantageous manner if the phenol resin is prepared from its components directly in the polymerized primary dispersion.

The present invention relates to a process for the preparation of a binder which is suitable for coating agents and is based on a combination which is essentially free of protective colloids and consists of an aqueous primary dispersion of a synthetic polymer and a water-insoluble polycondensate of phenols and aldehydes, some of which may be replaced by ketones, wherein the phenolic components for the polycondensate are first mixed with an aqueous primary dispersion of a synthetic polymer which contains glycidyl, carbonyl, N-methylol, N-alkoxymethyl, ether, amino and/or hydrazo groups and may furthermore contain hydroxyl or carboxyl groups, and the polycondensation with the aldehydes, some of which may be replaced by ketones, is then carried out in this mixture under conventional conditions.

The present invention furthermore relates to the use of the binders prepared according to the invention for dispersion paints and as heat-curable binders for metal coating.

According to the invention, the phenolic component of the resin is first added to the primary dispersion, which may be diluted, and the mixture is stirred, preferably at elevated temperatures, for example at about 50°–150° C. When dispersion of the phenolic component in the primary dispersion is complete, and appropriate amounts of aldehyde and/or ketone have been added, one or more condensation phases are carried out, novolak-like, resol-like, resitol-like or resite-like resins being obtained, depending on the reaction conditions. Surprisingly, the total colloidal system is retained and readily flowing dispersions which have a long shelf life, possess particle diameters of <1 $\mu$m, contain virtually no organic solvents and are suitable as binders for dispersion paints are obtained.

Regarding the components used for the novel process, the following may be stated specifically.

Suitable aqueous primary dispersions of a synthetic polymer which contains glycidyl, carbonyl, N-methylol, N-alkoxymethyl, ether, amino and/or hydrazo groups and may furthermore contain carboxyl or hydroxyl groups are conventional primary dispersions which contain, in stable dispersion, copolymers possessing such groups, in particular those which are sufficiently stable to pH changes and sufficiently compatible with the phenolic component of the polycondensate resin.

The above functional groups in the copolymer of the primary dispersions are obtained in a conventional manner by incorporating, as polymerized units, appropriate monomers which carry these functional groups.

Glycidyl-containing copolymers can be obtained by, for example, incorporating, as copolymerized units, glycidyl acrylate, glycidyl methacrylate or other olefinically unsaturated glycidyl compounds as can be prepared by, for example, reaction of di-, tri- or tetraepoxide compounds with acrylic acid or methacrylic acid.

Carbonyl-containing copolymers can be obtained by incorporating, as copolymerized units, unsaturated aldehydes and/or ketones, e.g. acrolein, methacrolein, crotonaldehyde, formylstyrene, vinyl methyl ketone, methyl isopropenyl ketone, diacetone acrylate, diacetoneacrylamide and/or butane-1,4-diol acrylate acetylacetate.

N-Methylol and N-alkoxymethyl groups can be incorporated into the copolymer of the primary dispersions by, for example, copolymerization of appropriate monomers such as N-methylol(meth)acrylamide and N-butoxymethyl(meth)acrylamide, respectively.

Ether-containing copolymers can be obtained by, for example, incorporating, as copolymerized units, alkoxy (meth)acrylates where alkoxy is of 2 to 10 carbon atoms, and esters of acrylic acid or methacrylic acid with oxaalkanediols where the oxaalkane groups are each of 2 to 20 carbon atoms; these last-mentioned esters can contain not only ether groups but also hydroxyl groups.

Amino-containing copolymers can be obtained by incorporating, as copolymerized units, appropriate amino-substituted (meth)acrylates or (meth)acrylamides, e.g. dimethylaminoethyl (meth)acrylate, diethylaminoethyl (meth)acrylate, dimethylaminoethyl(meth)acrylamide or diethylaminoethyl(meth)acrylamide, dimethylaminopropyl(meth)acrylamide or N-tert.-butylaminoethyl (meth)acrylate. Amino-containing copolymers may also be obtained by polymer-analogous reaction of, for example, glycidyl-containing copolymers with ammonia, primary or secondary amines or alkanolamines.

Hydrazo-containing copolymers can be obtained by, for example, incorporating, as copolymerized units, carbonyl-containing monomers of the abovementioned type and reaction with hydrazine or dihydrazides, e.g. adipodihydrazide.

Additional carboxyl groups can be introduced by, for example, incorporating, as copolymerized units, α,β-olefinically unsaturated carboxylic acids, e.g. acrylic acid, methacrylic acid, acrylamidoglycolic acid or crotonic acid, or olefinically unsaturated dicarboxylic acids, such as maleic acid, fumaric acid, itaconic acid, or the monoesters of these dicarboxylic acids, e.g. monoalkyl maleates or fumarates where alkyl is of 1 to 4 carbon atoms.

Additional hydroxyl groups can be introduced by, for example, incorporating, as copolymerized units, hydroxyalkyl acrylates or hydroxyalkyl methacrylates where alkyl is of 2 to 8, preferably 2 to 4 carbon atoms, e.g. hydroxyethyl (meth)acrylate, hydroxypropyl (meth)acrylate or butane-1,4-diol mono(meth)acrylate, or olefinically unsaturated alcohols, such as allyl alcohol.

The synthetic polymers or copolymers of the aqueous primary dispersions may contain one or more of each of the stated functional groups.

The copolymers of the aqueous primary dispersions generally contain, as copolymerized units, the monomers possessing the abovementioned functional groups in amounts of from 0.1 to 50, preferably from 0.3 to 15, in particular from 0.5 to 10% by weight, based on the copolymer.

Preferred functional groups are glycidyl groups, which can be introduced into the copolymer of the primary dispersion used according to the invention by, for example, incorporating, as copolymerized units, from 0.5 to 60, preferably from 2 to 30, in particular from 5 to 15% by weight, based on the total amount of the copolymerized monomers, of glycidyl methacrylate.

Suitable comonomers for the monomers possessing the above functional groups are the conventional olefinically unsaturated monomers which are copolymerizable with these, for example the esters of acrylic acid and/or methacrylic acid with straight-chain or branched monoalkanols of 1 to 12, preferably 1 to 8, carbon atoms, e.g. methyl (meth)acrylate, ethyl (meth)acrylate, propyl (meth)acrylate, butyl (meth)acrylate, 2-ethylhexyl (meth)acrylate and lauryl (meth)acrylate; vinyl esters of carboxylic acids of 2 to 4 carbon atoms, e.g. vinyl acetate and vinyl propionate, dialkyl esters of maleic and fumaric acid with monoalkanols of 1 to 4 carbon atoms, vinylaromatics, e.g. styrene, α-methylstyrene and vinyltoluene; acrylonitrile, methacrylonitrile, small amounts of up to 5% by weight, based on the copolymer, of acrylamide, methacrylamide and vinyl ethers of 3 to 10 carbon atoms, vinyl halides, such as vinyl chloride and vinylidene chloride; polyolefinically unsaturated compounds, such as butadiene and isoprene, and mixtures of the above monomers where these are copolymerizable with one another.

Preferred comonomers are acrylates, methacrylates, (meth)acrylonitrile, vinyl chloride, vinylidene chloride, styrene and butadiene.

The primary dispersions used according to the invention can be prepared by a conventional method, by emulsion polymerization of the monomers in aqueous dispersion in the presence of anionic or non-ionic emulsifiers, as described in, for example, H. Stache, Tensid-Taschenbuch, Karl Hanser-Verlag 1979, e.g. Na laurylsulfate, Na dodecylbenzenesulfonate, Na salts of acidic esters of sulfuric acid with adducts of octylphenol or nonylphenol with from 5 to 50 moles of ethylene oxide, adducts of octylphenol or nonylphenol with from 5 to 50 moles of ethylene oxide, fatty alcohol/ethylene oxide adducts and mixtures of anionic and non-ionic emulsifiers, polymerization initiators, e.g. peroxydisulfates or redox systems, and if necessary buffer substances, such as $K_2P_2O_7$, at from 30° to 150° C. Suitable methods of emulsion polymerization of monomer mixtures are described in, for example, Houben-Weyl, Methoden der organischen Chemie, volume 14/1.

It is advantageous if the primary dispersions possess adequate stability, in particular to changes in pH. A certain degree of compatibility of the phenolic building blocks of the polycondensate with the polymer particles is also advantageous.

For example, the following phenols can be used as phenolic components for the phenol resin to be prepared according to the invention in the aqueous primary dispersion: phenol, alkyl-substituted phenols where alkyl is of 1 to 12 carbon atoms, such as octylphenol, nonylphenol or dodecylphenol, and aryl-substituted phenols, e.g. 2-hydroxybiphenyl, 4-hydroxybiphenyl and bisphenols of the general formula

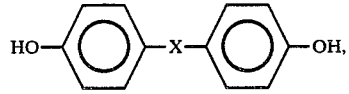

where X is a (branched) alkyl radical of 1 to 12, preferably 3 to 7, carbon atoms or $-SO_2-$, in particular bisphenol A or bisphenol S or a mixture of these. Bisphenol A and bisphenol S, in particular mixtures of bisphenol A with bisphenol S, alkyl-substituted phenols and/or hydroxybiphenyl are preferred.

The phenolic components used according to the invention preferably should possess little or no solubility in water, i.e. a solubility of less than 10 g/100 g of water at 20° C. and pH <5.

Suitable carbonyl components for the condensation are formaldehyde, acetaldehyde and their oligomeric forms, acrolein and dialdehydes, such as glutarodialdehyde, some of which may be replaced by ketones, such as acetone. Formaldehyde, paraformaldehyde and acetaldehyde are preferred carbonyl components for the polycondensation.

The molar ratio of the phenolic component to carbonyl groups of the aldehydes and/or ketones can be varied from about 1:0.8 to 1:3, and is preferably from 1:1.5 to 1:2.5, particularly preferably about 1:2.

In the novel process, the phenolic component is first mixed with the aqueous primary dispersion, for example while stirring, preferably at from 50° to 150° C. and if necessary under superatmospheric pressure. The phenolic components can be added in solid or liquid form to the aqueous primary dispersion, the temperature at the time of addition being lower than that during the subsequent mixing procedure.

The condensation of the phenolic component with the aldehyde (or ketone) to form the polycondensate in the aqueous primary dispersion can be carried out at from room temperature to about 200° C., preferably from 50° to 100° C., if necessary under superatmospheric pressure, at the natural pH of the primary dispersion and, if appropriate, with the addition of an acidic or basic catalyst, such as an inorganic or organic acid, ammonia or an amine. Resins possessing different reactivities are obtained, depending on the condensation conditions and the catalysts used. It is sometimes advantageous to begin the condensation at the natural pH of the primary dispersion, which is generally acidic, or with the addition of an acidic catalyst, and subsequently, after neutralization, to continue the condensation at an alkaline pH of from 8 to 10. The ratio of the copolymer to the phenol resin in the mixture can be varied from 99:1 to about 1:4, a ratio of from 4:1 to 1:1 being preferred; the upper limit for the ratio of phenol resin to copolymer in the primary dispersion is determined by the occurrence of new particle populations consisting of pure phenol resin, which always possess substantially larger particle diameters ($>10$ $\mu$m) and, particularly in the case of resins prepared by base-catalyzed reactions, cause substantial cloudiness in the pure binder film in amounts of only a few per cent by weight. The solids content of the dispersion containing phenol resin can be from 10 to 70, preferably from 30 to 60%, by weight.

The binder dispersions containing phenol resins and prepared according to the invention have a long shelf life and are generally employed as binders for coating agents. They are preferably used as binders for heat-curable metal coatings which exhibit good water resistance, good corrosion protection, good resistance to chemicals, good adhesion, high gloss and good mechanical properties on steel sheet which has not been pretreated, on zinc-phosphatized or iron-phosphatized steel sheet or on steel sheet provided with an electrocoating primer. These coatings are generally baked at from 100° to 200° C., preferably from 150° to 180° C.

The binders prepared according to the invention are particularly useful as binders for dispersion paints or as heat-curable binders for metal coating.

In the Examples which follow, parts and percentages are by weight, unless stated otherwise.

A. Preparation of the primary dispersion 32.1 parts of fully demineralized water are initially taken in a Witt pot equipped with a thermostat, a stirrer, a reflux condenser, various feed vessels, a thermometer and a nitrogen inlet. Feed I is a mixture of 14.4 parts of fully demineralized water, 2.14 parts of a 35% strength aqueous solution of a salt of a half ester of sulfuric acid with an adduct of about 25 moles of ethylene oxide and octylphenol, 17.55 parts of n-butyl acrylate, 10.35 parts of styrene, 9.9 parts of methyl methacrylate, 5.4 parts of glycidyl methacrylate and 1.8 parts of acrylic acid.

In feed vessel II, a solution of 0.225 part of potassium persulfate in 6 parts of water is prepared.

The reactor is flushed thoroughly with nitrogen, the content is heated to 85° C., 5% of feed II is added, and feed I and the remainder of feed II are then metered continuously into the reactor, alongside one another, in the course of 2¼ hours. The temperature is kept at 85° C. for a further hour, after which the mixture is cooled.

The dispersion obtained has a solids content of about 46%, a pH of about 2.2 and an LT value of about 50, corresponding to a mean particle diameter of about 250 nm (primary dispersion A).

B. Preparation of the dispersions containing phenol resin

EXAMPLE 1

200 parts of the primary dispersion prepared as described above, 50 parts of water, 25 parts of bisphenol A and 25 parts of technical-grade octylphenol are initially taken in an apparatus as described above, and heated to 90° C. while stirring. Stirring is continued for 1½ hours at this temperature, after which 40 parts of a 37% strength aqueous formalin solution are added, and the mixture is brought to pH 8.5 by means of about 30 parts of concentrated aqueous ammonia. Condensation is carried out for 3 hours at 90° C., while stirring, and the mixture is then cooled.

The resulting readily flowing dispersion has a solids content of about 43%, a pH of 10.3 and an LT value of about 32. A film about 70 $\mu$m thick which has been produced from the dispersion on a glass plate and then baked at 180° C. for 30 minutes is completely transparent, pale yellow and resistant to water and solvents and possesses a scratch hardness of about 3 H (pencil hardness scale). The dispersion has a shelf life of 6 months at room temperature (about 20° C.).

EXAMPLE 2

200 parts of the primary dispersion, 50 parts of fully demineralized water, 25 parts of bisphenol A and 25 parts of 4-hydroxybiphenyl are initially taken in the apparatus described above, and the mixture is stirred for 1½ hours at 90° C. Thereafter, 40 parts of a 37% strength aqueous formaldehyde solution and 6.6 parts of dimethylethanolamine are added, and condensation to produce the resin is carried out for 3 hours at 90° C.

The readily flowing dispersion obtained has a solids content of about 42%, a pH value of about 9 and an LT value of about 50. A film produced from the dispersion on glass and baked for 30 minutes at 180° C. is pale yellow-transparent and resistant to water and to solvents and possesses a hardness of about 2 H on the pencil hardness scale. The dispersion has a shelf life of 6 months at room temperature.

EXAMPLE 3

200 parts of the primary dispersion, 50 parts of fully demineralized water, 31.5 parts of bisphenol A and 18.5 parts of phenol are initially taken in the apparatus described above, and the mixture is stirred for 1½ hours. at 90° C. Thereafter, 37 parts of a 37% strength aqueous formalin solution, 13.8 parts of paraformaldehyde and 3.42 parts of dimethylethanolamine are added, and condensation is carried out for 6 hours at 60° C. The readily flowing dispersion obtained has a solids content of about 42%, a pH of about 6.5, and a shelf life of 6 months at room temperature.

COMPARATIVE EXAMPLE 1

Preparation of the phenol resin
11.2 parts of water and 11.2 parts of ethylene glycol are brought to pH 2.2 with a little sulfuric acid, and 11.2 parts of bisphenol A and 11.2 parts of technicalgrade octylphenol are then added. The phenols are dissolved at 90° C., after which 22.1 parts of aqueous 30% strength formalin solution are added, and the pH is brought to 8.5 with concentrated aqueous ammonia. Condensation is carried out for 3 hours at 90° C., while stirring.

Preparation of the mixture 90 parts of the primary dispersion A are added to the above phenol resin at 90° C., and the stirred mixture is cooled. After cooling, the phenol resin and the primary dispersion immediately separate into 2 phases.

COMPARATIVE EXAMPLE 2

11.2 parts of water and 11.2 parts of ethylene glycol are brought to pH 2.2 with a little sulfuric acid, and 11.2 parts of bisphenol A and 11.2 parts of 4-hydroxybiphenyl are then added. The phenols are dissolved at 90° C., after which 22.1 parts of aqueous 30% strength formalin solution and 3 parts of dimethylethanolamine are added. Condensation is carried out for 3 hours at 90° C., while stirring.

The mixture of the phenol resin and the primary dispersion is prepared as described in Comparative Example 1. The resulting highly viscous dispersion has a solids content of about 47%, a pH of about 9 and an LT value of about 50.

COMPARATIVE EXAMPLE 3

146.8 parts of phenol, 364.5 parts of aqueous 30% strength formalin solution, 186.5 parts of ethylglycol, 109.9 parts of paraformaldehyde and 250.7 parts of bisphenol A are condensed for 6 hours at 60° C. while stirring and with the addition of 27.2 parts of dimethylethanolamine. Thereafter, the mixture is concentrated to a solids content of 51% under reduced pressure and at an internal temperature of 40° C.

73 parts of the primary dispersion A are added to 55.4 parts of this phenol resin at 90° C., and the stirred mixture is cooled. The mixture obtained is a highly viscous dispersion which has a solids content of about 48% and a pH of about 6.5. After storage for 4 days at 25° C., this dispersion is completely crosslinked and no longer exhibits flow.

The Table below shows the properties of films produced from the dispersions of Examples 1 to 3 and of Comparative Examples 1 to 3.

The addition of ethylene glycol as the solubilizer in the Comparative Examples was necessary in order to be able to prepare the phenol resins; without the addition of ethylene glycol, inhomogeneous non-dispersible phenol resins are obtained.

On the other hand, the addition of ethylene glycol is unnecessary in the Examples according to the invention, but does not have an adverse effect.

TABLE

| | Example No. | | | Comparative Example No. | | |
|---|---|---|---|---|---|---|
| | 1 | 2 | 3 | 1 | 2 | 3 |
| Baking conditions [min/°C.] | 30/180 | 30/180 | 30/180 | 30/180 | 30/180 | 30/180 |
| Layer thickness [μm] | 12 | 15 | 13 | 12 | 15 | 13 |
| Pendulum hardness DIN 53,157 [sec] | 200 | 200 | 190 | 150 | 150 | 170 |
| Erichsen deep-drawing value DIN 53,156 [mm] | 10 | 10 | 10 | 9 | 9 | 9 |
| Gloss (60%) DIN 67,530 [%] | 100 | 100 | 96 | 40 | 45 | 80 |
| Shelf Life at 25° C., in days | 180 | 180 | 180 | 1 | 10 | 4 |
| Corrosion protection DIN 53,167 [days/ underpenetration in mm] | 1/20 | 2/15 | 2/5 | 1/25 | 2/25 | 2/5 |

EXAMPLE 4

Preparation of an amino-containing primary dispersion and conversion to a resol 24 parts of water and 2 parts of 25% strength ammonia water are added to 240 parts of the primary dispersion A, and the mixture is heated to 90° C. and boiled at this temperature for 30 minutes. 60 parts of bisphenol A are added to the resulting $NH_2$-containing primary dispersion, and the mixture is stirred for 90 minutes at 90° C. Thereafter, 48 parts of a 37% strength formaldehyde solution are added, followed by the addition of 5.3 parts of dimethylethanolamine after a further 30 minutes. Condensation is continued at 70° C. for a further 5 hours to give a pale yellow readily flowing dispersion which has a long shelf life, a solids content of about 47% by weight, a pH of about 8.4 and a mean particle size $d_{ns}$ of about 250 nm.

EXAMPLE 5

Preparation of an N-methylol-containing primary dispersion and conversion to a resol An N-methylol-containing primary dispersion is prepared by the method given in Example 1 of German Laid-Open Application DOS No. 2,213,756.

In a reactor provided with an inlet for inert gas, a stirrer and a feed vessel, a mixture of 700 parts of water, 30 parts of an adduct of 1 mole of n-octylphenol with 23 moles of ethylene oxide and 9 parts of a sulfated adduct obtained from n-octylphenol with 23 parts of ethylene oxide and neutralized with sodium hydroxide solution is heated to 87° C. under an inert gas, while stirring. A solution of 0.5 part of potassium persulfate in 12 parts of water is added to this initially taken mixture at 85° C. A primary emulsion of 660 parts of styrene, 520 parts of 2-ethylhexyl acrylate, 20 parts of acrylonitrile, 13 parts of acrylic acid, 10 parts of N-methylolmethacrylamide, 1 part of diallyl phthalate, 5 parts of sodium dodecylbenzenesulfonate, 10 parts of the sodium salt of the adduct of n-octylphenol with 23 moles of ethylene oxide, 0.1 part of ammonium carbonate and 770 parts of water (feed I) is introduced uniformly into the polymerization reactor in the course of 3 hours at 87° C. At the same time, a solution of 4.5 parts of potassium persulfate in 110 parts of water is run into the reactor (feed II). Two hours after the end of the feed, the polymerization at 87° C. has proceeded to 98.5% conversion. The resulting finely divided polymer dispersion is cooled and then brought to pH 8 with ammonia. This dispersion has a solids content of 44%.

240 parts of this dispersion are brought to about pH 7.5 with a mixture of 2.6 parts of dimethylethanolamine in 24 parts of water, heated to 90° C. and stirred with 60 parts of bisphenol S for 90 minutes. 50 parts of 37% strength aqueous formaldehyde solution are added, followed by the addition of 5.5 parts of dimethylethanolamine after a further 15 minutes. Condensation is carried out for 3 hours at 90° C. A readily flowing dispersion which is not discolored, possesses a long shelf life and has a solids content of about 44% by weight and a pH of about 8 is obtained.

EXAMPLE 6

Preparation of a carbonyl-containing primary dispersion and conversion to a resol A carbonyl-containig primary dispersion is prepared by the method given in German Laid-Open Application DOS No. 2,819,092, Example 1.

1050 parts of water, 13.5 parts of a 35% strength aqueous solution of the sodium salt of a half ester of sulfuric acid with the reaction product of 20 moles of ethylene oxide and p-nonylphenol (anionic emulsifier), and 45 parts of a 20% strength solution of a reaction product of 25 moles of ethylene oxide with p-nonylphenol (non-ionic emulsifier) are initially taken in a Witt pot equipped with a thermostat, an anchor stirrer, a reflux condenser, feed vessels, a thermometer and a nitrogen inlet.

Feed I is a mixture of 504 parts of water, 66 parts of a 35% strength solution of the abovementioned anionic emulsifier, 880 parts of methyl methacrylate, 850 parts of n-butyl acrylate, 95 parts of acrolein, 20 parts of acrylic acid and 30 parts of acrylamide.

A solution of 7.5 parts of potassium persulfate in 180 parts of water is prepared in the feed vessel.

The reactor is flushed thoroughly with nitrogen, after which 10% of feed I are added to the initially taken mixture, and the mixture is heated to 90° C. 10% of feed II is introduced into the reactor all at once, after which the remainder of feeds I and II are introduced uniformly into the reactor, alongside one another, in the course of 3 hours and 3.5 hours, respectively. When the addition is complete, the temperature is kept at 90° C. for a further 1½ hours, after which the reactor is cooled to room temperature.

The dispersion is cooled and then brought to pH 7 with dimethylethanolamine. 20 parts of H$_2$O and 50 parts of bisphenol A are added to 200 parts of this primary dispersion, and the mixture is heated to 90° C. and stirred for 2 hours. Thereafter, 40 parts of a 37% strength aqueous formaldehyde solution are added, followed by the addition of 6 parts of 2-amino-2-methylpropan-1-ol after a further 2 hours. Condensation is continued for a further 3 hours at 90° C., after which the mixture is cooled to give a readily flowing dispersion which shows scarcely any discoloration, possesses a long shelf life and has a solids content of about 47% by weight, a pH of 8.5 and a mean particle size $\bar{d}_{ns} \approx 200$ nm.

We claim:

1. In a process for the preparation of a binder which is suitable for use in coating agents and which is essentially free of protective colloid, which binder consists essentially of (1) an aqueous primary dispersion of a synthetic polymer, and (2) a water-insoluble polycondensate of phenols and aldehydes, the improvement which consists essentially of: mixing an aqueous primary dispersion of a synthetic polymer which contains glycidyl, carbonyl, N-methylol, N-alkoxymethyl, ether, amino or hydrazo groups with the phenolic component(s) of the polycondensate in the substantial absence of a protective colloid and thereafter polycondensing the mixture with the aldehyde component(s).

2. The process of claim 1, wherein the phenolic component used is one which has a solubility of less than 10 g in 100 g of water at 20° C. and ph <5.

3. The process of claim 1, wherein the phenolic component used is bisphenol A or a mixture of this with phenol, an alkyl-substituted phenol, hydroxybiphenyl or mixture thereof.

4. The process of claim 1, wherein the aqueous primary dispersion of a synthetic polymer which is used is one which contains glycidyl acrylate or glycidyl methacrylate as copolymerized units.

5. The process of claim 1, wherein the aldehyde used for the polycondensation is formaldehyde, paraformaldehyde, acetaldehyde or a mixture of these.

6. The process of claim 1, wherein the synthetic polymer further contains carboxyl or hydroxyl groups.

7. The process of claim 1, wherein some of the aldehyde component is replaced by ketone(s).

* * * * *